US009759571B2

(12) United States Patent
Nakahara et al.

(10) Patent No.: US 9,759,571 B2
(45) Date of Patent: Sep. 12, 2017

(54) NAVIGATION SYSTEM AND NAVIGATION METHOD OF ELECTRONIC DEVICE

(71) Applicant: HONDA MOTOR CO., LTD., Tokyo (JP)

(72) Inventors: Daisuke Nakahara, Tokyo (JP); Shigeomi Kubota, Tokyo (JP); Naoyuki Nishibu, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/284,775

(22) Filed: Oct. 4, 2016

(65) Prior Publication Data
US 2017/0023371 A1    Jan. 26, 2017

Related U.S. Application Data

(62) Division of application No. 14/500,183, filed on Sep. 29, 2014, now Pat. No. 9,470,546.

(30) Foreign Application Priority Data

Nov. 14, 2013  (JP) ................. 2013-236068

(51) Int. Cl.
*G01C 21/34*     (2006.01)
*G01C 21/36*     (2006.01)
*G01C 21/20*     (2006.01)

(52) U.S. Cl.
CPC ......... *G01C 21/3407* (2013.01); *G01C 21/20* (2013.01); *G01C 21/3667* (2013.01);
(Continued)

(58) Field of Classification Search
CPC  G01C 21/3407; G01C 21/20; G01C 21/3667; G01C 21/3679; G01C 21/3611; G01C 21/3697
See application file for complete search history.

(56) References Cited

U.S. PATENT DOCUMENTS 6,009,403 A  * 12/1999 Sato ................... G01C 21/343
                                                340/990
8,160,815 B2 *  4/2012 Geelen ............... G01C 21/3641
                                                701/410
(Continued)

FOREIGN PATENT DOCUMENTS

JP      2005-300225      10/2005

OTHER PUBLICATIONS

Screen samples from a movie displayed at "CEATEC Japan 2013" (exhibition) on Oct. 1, 2013, by Daisuke Nakahara, Shigeomi Kubota, and Naoyuki Nishibu, along with a summary of Properties of the Movie File. English translation included.

*Primary Examiner* — Todd Melton
(74) *Attorney, Agent, or Firm* — Rankin, Hill & Clark LLP

(57) ABSTRACT

An electronic device includes: a facility genre setting part that displays first route information from a departure position to a destination, and sends a genre of facilities at which a user wants to stop to a navigation server; a facility setting part that scrollably displays facility information of all facilities belonging to the genre that are located in the vicinity on the first route and an expected arrival time received from the navigation server, for every time span of the expected arrival time, and sends a facility selected by the user from among the plurality of facilities to the navigation server; and a route guidance part that displays second route information received from the navigation server in which the facility selected by the user is registered as a relay point.

2 Claims, 12 Drawing Sheets

(52) U.S. Cl.
CPC ...... *G01C 21/3679* (2013.01); *G01C 21/3611* (2013.01); *G01C 21/3697* (2013.01)

(56) References Cited

U.S. PATENT DOCUMENTS

| | | | |
|---|---|---|---|
| 9,151,614 B2* | 10/2015 | Poppen | G01C 21/3476 |
| 9,171,327 B2* | 10/2015 | Nallu | G06Q 30/0633 |
| 2009/0216732 A1 | 8/2009 | Feng | |
| 2010/0057347 A1* | 3/2010 | Sugiyama | G01C 21/3679 |
| | | | 701/465 |
| 2014/0278091 A1* | 9/2014 | Horvitz | G01C 21/3679 |
| | | | 701/533 |

* cited by examiner

NAVIGATION SYSTEM AND NAVIGATION METHOD OF ELECTRONIC DEVICE

This application is a divisional of U.S. Ser. No. 14/500,183 filed Sep. 29, 2014 and is based on and claims the benefit of priority from Japanese Patent Application No. 2013-236068, filed on 14 Nov. 2013, the content of which is incorporated herein by reference.

BACKGROUND OF THE INVENTION

Field of the Invention

The present invention relates to a navigation system and a navigation method of an electronic device that present to the user facilities that are in the middle of a route to a destination.

Related Art

Conventionally, in the case of traveling by automobile or on foot to a destination, technology that performs navigation (hereinafter also referred to as "route guidance") using an electronic device such as a mobile telephone and smart phone has been realized.

While the user is traveling to the destination, there are needs for the user to stop in the middle of the route for meals, convenience stores, restrooms, refueling of gasoline, recharging, etc. Various technologies for responding to such needs have been developed.

As the most common technology, there is technology whereby an electronic device searches and presents facilities that are in the vicinity of a current location in response to a request from the user. However, the electronic device can only search and present facilities that are in the vicinity of a current location. The electronic device has not been able to respond to the needs of a user like "want a meal after 2 hours", for example.

In order to respond to such needs of the user, technology has been disclosed whereby, upon the user performing navigation (route guidance) using the electronic device, the electronic device prompts the user to input a designated time, specifies a location on the route that will be reached at this designated time, and then does a facility search in the vicinity of the specified location (for example, refer to Patent Document 1).

Patent Document 1: Japanese Unexamined Patent Application, Publication No. 2005-300225

SUMMARY OF THE INVENTION

With the technology disclosed in Patent Document 1, the operations for the user are complicated since it is necessary for the user to input a designated time in the electronic device. Furthermore, the user has only been able to read limited information like facilities in the vicinity of the location reached at the designated time.

In the case of there being few facilities due to the vicinity of this location being in the suburbs, since inevitably only a few facilities can be presented, the electronic device cannot present information corresponding to the designated time of the user that can satisfy the user. As a result thereof, the options for facilities of the user have been narrow.

While traveling to the destination, in the case of the user selecting a facility at which to stop in the middle of a route, it is desirable for the user to be able to decide the facility at which to stop, upon visually comparing the time span of use and extent of attraction to the facility. For example, in the case of the user considering "want a meal at about 7 PM", between a shop with an arrival estimate of about 7 PM and a shop with an arrival estimate of about 8 PM, the attractiveness of a shop may be higher for the shop with the arrival estimate of about 8 PM. In such a case, it is possible for the user to decide to have a meal at the shop arrived at about 8 PM.

However, with the technology disclosed in Patent Document 1, the electronic device cannot present options like those enabling a user to comparatively consider facilities at which to stop in the middle of a route extending over different arrival time spans.

As stated above, a conventional electronic device has not been able to perform the presentation of more options extending over different time spans for the needs of a user to stop at facilities in the middle of traveling to a destination.

The present invention has been made taking such problems into account. The present invention has an object of providing a navigation system and a navigation method for an electronic device that, upon a user performing navigation (route guidance) using an electronic device, enable the electronic device to perform the provision of more options, for facilities existing on a searched route, extending over different time spans to the user by performing a simple operation.

By configuring in this way, it is possible for a user himself/herself to refine facilities to be candidates from among the many options extending over different time spans presented by the electronic device. By configuring in this way, it is an object to provide a navigation system and a navigation method for an electronic device that enable the satisfaction level of the user to be raised.

According to a first aspect of the present invention, a navigation system (e.g., the navigation system 100 described later) includes an electronic device (e.g., the electronic device 3 described later) that performs navigation from a departure position to a destination; and a server (e.g., the navigation server 1 and facility information server 2 described later) that is communicably connected with the electronic device, in which the server includes: a storage unit (e.g., the storage unit 21 described later) that stores facility information; a facility search unit (e.g., the facility search part 102 described later) that searches, from among facilities located in the vicinity on a first route from a departure position to a destination, for a facility belonging to a genre received from the electronic device, using the facility information saved in the storage unit, calculates an expected arrival time for all facilities found, and sends the facility information of the facility belonging to the genre and the expected arrival time to the electronic device; and a second route calculation unit (e.g., the second route calculation part 103 described later) that calculates second route information from the departure position to the destination that registers a facility selected by a user and received from the electronic device as a relay point, and sends the second route information to the electronic device, and in which the electronic device includes: a display unit (e.g., the display unit 34 described later); a facility genre setting unit (e.g., the facility genre setting part 302 described later) that sends a genre selected by the user to the server; a facility setting unit (e.g., the facility setting part 303 described later) that displays facility information of all facilities belonging to the genre that are located in the vicinity on the first route and an expected arrival time at the facility, received from the server, for every time span of the expected arrival time, via the display unit to be scrollable; and a route guidance unit (e.g., the route guidance part 304 described later) that displays the second route information from the departure position to the destination received from the server in which the facility selected by the user is registered as a relay point, on the display unit.

With the navigation system of the first aspect, the facility setting unit of the electronic device displays facility information of all facilities belonging to the genre selected by the user located in the vicinity on the first route from the departure position to the destination and the expected arrival time at the facility, for every time span of the expected arrival time, via the display unit to be scrollable.

It is thereby possible for the electronic device to present more facilities extending over different time spans to the user, for facilities existing on a searched route, upon the user performing navigation (route guidance) using the electric device. The user can select a preferred facility from more options, and the satisfaction of the user improves by registering as relay points (stopping points) on a route to the destination.

According to a second aspect of the present invention, an electronic device (e.g., the electronic device 3 described later) that performs navigation from a departure position to a destination includes: a display unit (e.g., the display unit 34 described later); a facility genre setting unit (e.g., the facility genre setting part 302 described later) that displays first route information from the departure position to a destination on the display unit, and sends to a server communicably connected with the electronic device, a genre of facilities input by a user; a facility setting unit (e.g., the facility setting part 303 described later) that displays facility information of all facilities belonging to the genre, located in the vicinity on the first route, and an expected arrival time at the facility, received from the server for every time span of the expected arrival time via the display unit to be scrollable, and sends a facility selected by the user from among a plurality of facilities to the server; and a route guidance unit (e.g., the route guidance part 304 described later) that displays second route information from the departure position to the destination received from the server in which the facility selected by the user is registered as a relay point, on the display unit.

According to the electronic device of the second aspect, for facilities located in the vicinity on the first route to the destination, it is possible for the electronic device to present to the user more facilities extending over different time spans by performing a simple operation. The user can select a preferred facility from more options, and a second route registering this as a relay point (stopping point) on a route to the destination can be displayed.

The satisfaction of the user is thereby improved since a preferred facility and preferred time span are selected from the facilities existing on the searched route, and with the facility selected by the user on the route to the destination as a relay point (stopping point), second route information is presented to arrive in the time span selected by the user, upon the user performing navigation (route guidance) using the electronic device.

According to a third aspect of the present invention, a program causes a control unit (e.g., the control unit 30 described later) of an electronic device (e.g., the electronic device 3 described later) that includes the control unit and a display unit (e.g., the display unit 34 described later) to function as: a genre facility genre setting unit (e.g., the facility genres setting part 302 described later) that displays first route information from a departure position to a destination on the display unit, and sends a genre of facilities input by a user to a server; a facility setting unit (e.g., the facility setting part 303 described later) that scrollably displays, via the display unit, facility information of all facilities belonging to the genre located in the vicinity on the first route and an expected arrival time at the facility received from the server, for every time span of the expected arrival time, and sends a facility selected by the user from among a plurality of the facilities to the server; and a route guidance unit (e.g., the route guidance part 304 described later) that displays second route information from the departure position to the destination received from the server in which a facility selected by the user is registered as a relay point, on the display unit.

According to a fourth aspect of the present invention, a navigation method by an electronic device (e.g., the electronic device 3 described later) including a control unit (e.g., the control unit 30 described later) and a display unit (e.g., the display unit 34 described later) includes the steps of the control unit: displaying first route information from a departure position to a destination on the display unit, and sending a genre of facilities input by a user to a server (e.g., Step S104 to Step S108 described later); scrollably displaying, via the display unit, facility information of all facilities belonging to the genre located in the vicinity on the first route and an expected arrival time at the facility received from the server, for every time span of the expected arrival time, and sending a facility selected by the user from among a plurality of the facilities to the server (e.g., Step S109 to Step S112 described later); and displaying second route information from the departure position to the destination received from the server in which a facility selected by the user is registered as a relay point (e.g., Step S113 described later).

The same effects as the electronic device of the second aspect are exerted according to the program of the third aspect or the method of the fourth aspect.

According to a fifth aspect of the present invention, a server (e.g., the navigation server 1 and facility information server 2 described later) that performs navigation from a departure position to a destination includes: a storage unit (e.g., the storage unit 21 described later) that stores facility information; a facility search unit (e.g., the facility search part 102 described later) that searches, from among facilities located in the vicinity on a first route from a departure position to a destination, for a facility belonging to a genre received from an electronic device communicably connected with the server, using the facility information saved in the storage unit, calculates an expected arrival time for all facilities found, and sends the facility information of the facility and the expected arrival time to the electronic device; and a second route calculation unit (e.g., the second route calculation part 103 described later) that calculates second route information from the departure position to the destination that registers a facility selected by a user and received from the electronic device as a relay point, and sends the second route information to the electronic device.

According to the server of the fifth embodiment, it is possible to provide a service to the electronic device communicably connected with the server whereby, for facilities located in the vicinity on the first route to the destination, the electronic device presents more facilities extending over different time periods to the user, and a second route is displayed in which a preferred facility selected from among more options by the user is registered as a relay point (stopping point) on the route to the destination.

The satisfaction of the user is thereby improved since the server prompts the user to select a preferred facility from the facilities existing on a route found and a preferred time span, and presents second route information to arrive in the time span selected by the user, in which a facility selected by the user is registered as a relay point (stopping point) on the route to the destination, upon the user performing navigation (route guidance) using the electronic device communicably connected with the server.

According to a sixth aspect of the present invention, a program causes a control unit (e.g., the controls units 10 and 20 described later) of a server (e.g., the navigation server 1 and the facility information server 2 described later) that includes the control unit and a storage unit (e.g., the storage unit 21 described later) storing facility information, to function as: a facility search unit (e.g., the facility search part 102 described later) that searches, from among facilities located in the vicinity on a first route from a departure position to a destination, for facilities belonging to a genre received from an electronic device communicably connected with the server, using the facility information saved in the storage unit, calculates an expected arrival time for each facility found, and sends facility information of the facility and the expected arrival time to the electronic device; and a second route calculation unit (e.g., the second route calculation part 103 described later) that calculates second route information from the departure position to the destination that registers a facility selected by a user and received from the electronic device as a relay point, and sends the second route information to the electronic device.

According to a seventh aspect of the present invention, a navigation method by a server (e.g., the navigation server 1 and facility information server 2 described later) that includes a control unit (e.g., the control units 10 and 20 described later) and a storage unit (e.g., the storage unit 21 described later) storing facility information, includes the steps of the control unit: searching, from among facilities located in the vicinity on a first route from a departure position to a destination, for facilities belonging to a genre received from an electronic device communicably connected with the server, using the facility information saved in the storage unit, calculating an expected arrival time for each facility found, and sending facility information of the facility and the expected arrival time to the electronic device (e.g., Step S204 to Step S206 described later); and calculating second route information from the departure position to the destination that registers a facility selected by a user and received from the electronic device as a relay point, and sending the second route information to the electronic device (e.g., Step S207 to Step S208 described later).

The same effects as the server of the fifth aspect are exerted according to the program of the sixth aspect or the method of the seventh aspect.

According to the present invention, it is made possible for an electronic device to present a user with more options for facilities existing on a searched route extending over different time spans, despite being a simple operation, upon the user performing navigation (route guidance) using the electronic device. Then, by the user himself/herself refining the time span and candidate facilities from among the many options presented by the electronic device, the electronic device makes it possible to raise the satisfaction level of the user.

DETAILED DESCRIPTION OF THE INVENTION

First Embodiment

Hereinafter, a preferred embodiment of a navigation system of the present invention will be explained while referencing FIGS. 1 to 5G.

(Functional Configuration of Navigation System 100)

The functional configuration of the navigation system 100 according to a preferred embodiment of the present invention will be explained.

Figure 1:
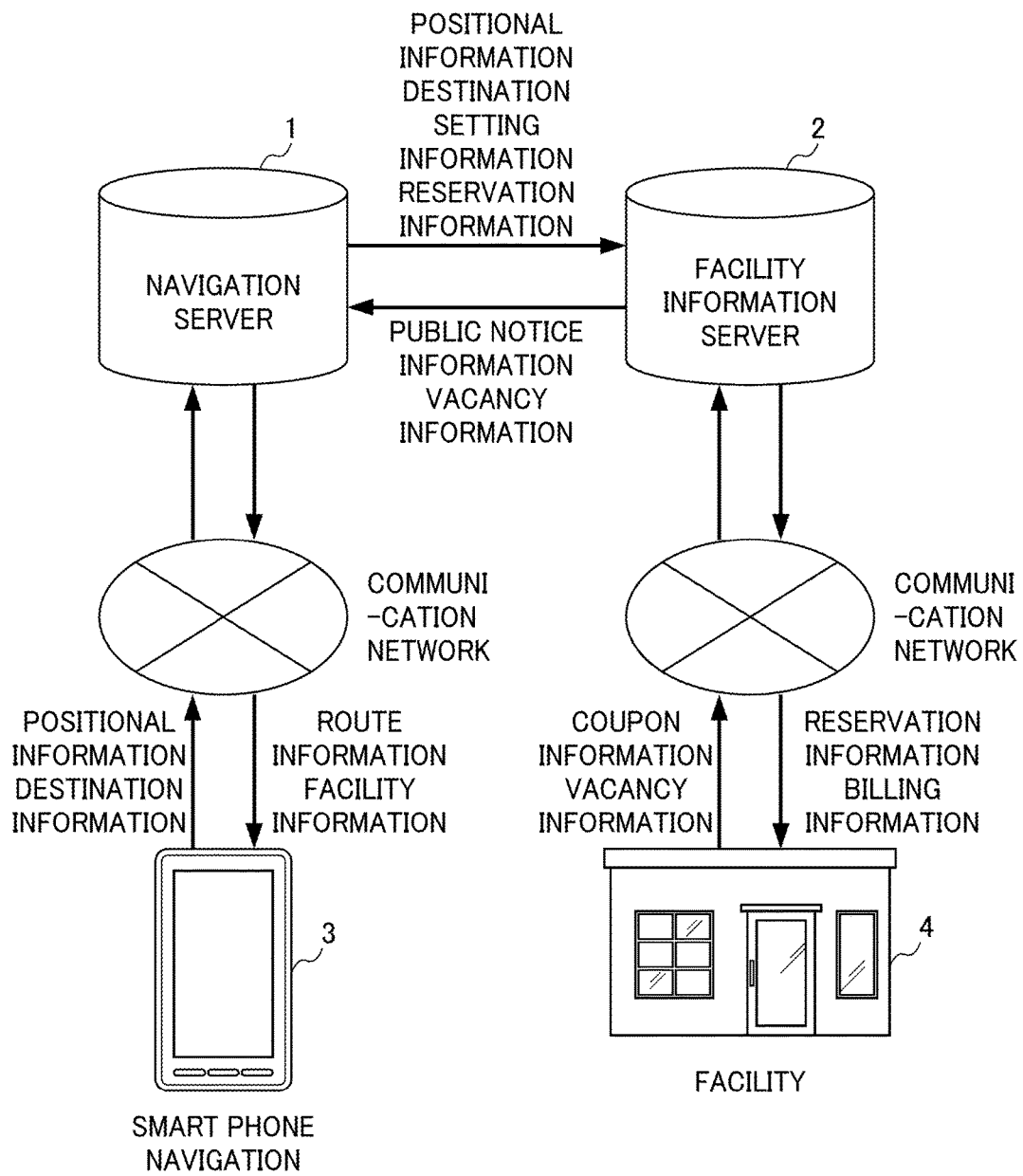
FIG. 1 is a view showing the system configuration of a navigation system 100.

As shown in FIG. 1, the navigation system 100 is configured to include a navigation server 1, facility information server 2, electronic device 3, and facility server 4.

The navigation server 1 calculates and transmits an optimum route (guidance information) to the electronic device 3 based on the current position of the electronic device 3 and coordinate information of the destination, as described later.

The facility information server 2 saves the type, name, etc. of facilities along with positional information, is connected with the navigation server 1 by a connection interface unit 23, and transmits information to the electronic device 3 via the navigation server 1. The facility information server 2 saves information of the vacancy condition and reservation of facilities. It should be noted that facility information is also generally called POI (Point of Interest).

In the embodiment of the present invention, although the navigation server 1 and facility information server 2 are described as separate servers, the functions of the navigation server 1 and facility information server 2 may be realized in one server. In addition, it may be configured as a decentralized processing system that distributes the respective functions of the navigation server 1 and facility information server 2 to a plurality of servers as appropriate. In addition, the respective functions of the navigation server 1 and facility information server 2 may be realized using virtual server functions, etc. on a cloud.

The electronic device 3 includes electronic devices having a wireless function that is mobile telephone, smart phone, tablet terminal, PDA, portable navigation device, notebook computer, or other portable electronic device. In addition, the electronic device 3 includes a car navigation device built into a vehicle, PND, etc. Software for navigation (route guidance) is installed in the electronic device 3, and conducts route guidance from the current position to the destination based on the request of the user.

It should be noted that the software for navigation (route guidance) may be installed in advance. In addition, it may be appropriately downloaded as necessary when sending/receiving with the navigation server 1.

The facility server 4 sends/receives with the facility information server 2 via a network such as the internet, in order to synchronize in relation to information related to its own facility, vacancy information, coupon issuance information, etc.

Next, the configurations of each will be explained.
(Navigation Server 1)

Figure 2:
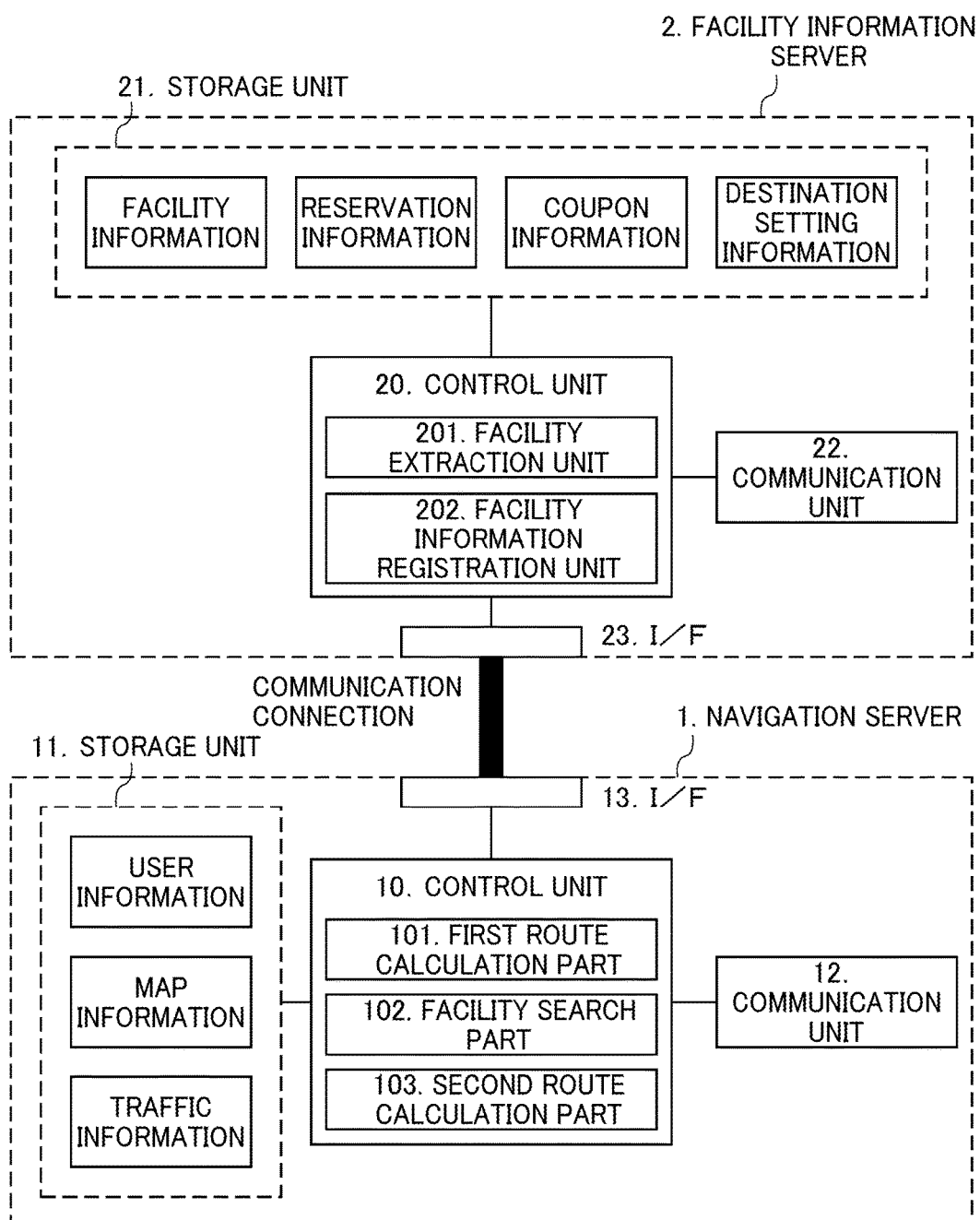
FIG. 2 is a view showing the configurations of servers.

As shown in FIG. 2, the navigation server 1 at least includes a control unit 10, storage unit 11, communication unit 12 and connection interface unit 13.

The control unit 10 is configured from a processor including a CPU, RAM, ROM, I/O, etc. The CPU executes each program for navigation read from the RAM, ROM or storage unit 11, reads information from the RAM, ROM and storage unit 11 upon execution thereof, performs writing of information in the RAM and storage unit 31, and performs transfer of signals with the communication unit 12 and connection interface unit 13.

By the control unit 10 executing each program for navigation, it causes to function as a predetermined means (hereinafter collectively referred to as "navigation processing unit") in the navigation server 1.

In addition, by the control unit 10 executing each program for navigation, it causes predetermined steps ("hereinafter collectively referred to as "navigation processing step") to be executed in the navigation server 1.

Hereinafter, the functions possessed by the control unit 10 will be explained from the viewpoint of a navigation processing unit. It should be noted that an explanation based on the viewpoint of a navigation processing step (method) is omitted since it is possible to explain by substituting "unit" for "step".

The control unit 10 includes a first route calculation part 101, facility search part 102 and second route calculation part 103.

The first route calculation part 101 calculates a first route that is an optimum route from the departure position to the destination, using map information saved in the storage unit 11, based on positional information that is the departure position and coordinate information of the destination, and departure time as an option, received from the electronic device 3.

Herein, optimum route is the matter of a route best satisfying the intended conditions designated by the user, such as most shortened arrival time, shortest distance, prioritizing local roads, prioritizing toll roads, low fare for toll roads, etc., low $CO_2$ emissions, for example.

The intended conditions may be decided by the first route calculation part 101 in advance. In addition, the first route calculation part 101 may set based on a selection instruction from the electronic device 3.

In addition, the first route calculation part 101 may calculate a plurality of routes from the departure position to the destination, and decide a first route based on an instruction from the electronic device 3 from among the plurality of routes.

The facility search part 102 extracts facility related information for all facilities belonging to the genre selected by the user located in the vicinity on the first route, using a facility extraction part 201 of the facility information server 2 described later, and compiles the extracted facility related information.

Herein, the facility related information at least includes facility information and the expected arrival time at the facility. The facility information includes, for example, the identification information of facilities, name, genre, telephone number, address, positional information specified by the latitude/longitude, for example, information related to goods and services provided by the facility, vacancy information, coupon issuance information, etc., as described later.

The facility search part 102 groups a plurality of facility related information located in the vicinity on the first route for every time span of the expected arrival time.

Time spans of the expected arrival time, for example, indicates time spans based on 1 hour intervals like between 12 PM and 1 PM and between 1 PM and 2 PM, or 30 minute intervals like between 12 PM and 12:30 PM and between 12:30 PM and 1 PM. Regarding what time interval to set the time span, it may be set by the facility search part 102 in advance. In addition, the facility search part 102 may set the time span to 1-hour units in the case of the required time needed from the departure position to the place of arrival being long, and may set the time span to 30-minute units in the case of the required time being short. The facility search part 102 may appropriately decide the time span proportionally to the length of a required time needed from the departure position to the place of arrival. In addition, the facility search part 102 may determine the time span based on an instruction form the electronic device 3.

With the facility selected by the user and staying time for stopping at the facility input by the user as additional conditions, the second route calculation part 103 calculates second route information using map information saved in the storage unit 11, based on the positional information of the departure position, coordinate information of the destination, coordinate information of the facility selected by the user, staying time at the facility, etc.

It should be noted that the second route is a route produced taking into account of a short stop and staying time at a facility located in the vicinity on the first route, and the second route information includes the expected arrival time at the facility and staying time.

The second route calculation part 103 requests registration processing on My Page of the user to the facility information server 2, in relation to a facility registered as a stopping point on the second route. The second route calculation part 103 requests reservation processing for the facility and payment processing in the facility information server 2, according to the registration requirements on My Page of the user.

User information, map information, etc. of the electronic device 3 are stored in advance in the storage unit 11. In addition, traffic information received from a traffic information center is stored along with a recording time received in the storage unit 11. The number of traveling vehicles for every link, required travel time, delay information, traffic control information, weather information, etc. are included in the traffic information, for example.

In addition, past traffic information of links, etc. is also recorded in the storage unit 11.

Road network data, etc. including display map data for displaying a background such as roads and road maps, positional information of nodes (for example, intersections, curves, dead ends, etc.) and classification information thereof, positional information of links that are paths connecting between respective nodes and classification information thereof, link toll data relating to toll information of all links (for example, distance, required time, etc.) are included in the map information.

The communication unit 12 is connected to a mobile telephone network, and conducts sending/receiving (data communication) of packet data, etc. with the electronic device 3 through a wireless base station that is not illustrated. It should be noted that, other than a mobile telephone network, it may be a network for data communicating with the electronic device 3.

The connection interface unit 13 connects the navigation server 1 to the facility information server 2. The navigation server 1 performs sending/receiving of data with the facility information server 2 via the connection interface unit 13.

(Facility Information Server)

As shown in FIG. 2, the facility information server 2 at least includes a control unit 20, storage unit 21, communication unit 22, and connection interface unit 23.

The control unit 20 is configured from a processor having a CPU, RAM, ROM, I/O, etc. The CPU executes each program for facility information search which was read from the RAM, ROM or storage unit 31, reads information from the RAM, ROM and storage unit 21 upon execution thereof, performs writing of information in the RAM and storage unit 21, and performs transfer of signals with the communication unit 22 and connection interface unit 23.

By the control unit 20 executing each program for facility information search, it causes to function as a predetermined means (hereinafter collectively referred to as "facility information processing unit") in the facility information server 2.

In addition, by the control unit 20 executing each program for facility information search, it causes predetermined steps ("hereinafter collectively referred to as "facility information processing step") to be executed in the facility information server 2.

Hereinafter, the functions possessed by the control unit 20 will be explained from the viewpoint of a facility information processing unit. It should be noted that an explanation based on the viewpoint of a facility information processing step (method) is omitted since it is possible to explain by substituting "unit" for "step".

As shown in FIG. 2, the control unit 20 includes a facility extraction part 201 and facility information registration part 202.

Based on the first route information received from the navigation server 1 and facility genre information selected by the user, the facility extraction part 201 extracts facility information of all facilities belonging to the genre located in the vicinity on the first route, using the facility information saved in the storage unit 21.

Herein, located in the vicinity on the first route indicates the matter of being present in a predetermined distance range in which a short stop is possible, from the nearest point on the first route. A predetermined value (for example, 100 m) is set in the facility extraction part 201. It should be noted that the predetermined distance range can be set based on an instruction from the user.

The facility extraction part 201 stores nearest points on the first route corresponding to the candidate facilities for respective extracted candidate facility information in the working memory of the storage unit 21.

The facility extraction part 201 calculates an expected arrival time from the departure position for each of the extracted candidate facilities. Herein, expected arrival time, for example, may be calculated using a value set as a default value of average vehicle speed.

It should be noted that the processing to calculate the expected arrival time from the departure position for every extracted candidate facility may be established as processing of the navigation server 1.

It should be noted that the facility information includes, for example, the identification information of facilities, name, genre, telephone number, address, positional information specified by the latitude/longitude, for example, information related to goods and services provided by the facility, vacancy information, coupon issuance information, etc., as described later.

The facility information registration part 202 stores facilities received from the navigation server 1 and registered as stopping points on the second route, in a destination setting information column of My Page for every user in the storage unit 21.

The facility information registration part 202 performs reservation at the facility based on an instruction from the user. The facility information registration part 202 accesses the facility server 4 corresponding to the facility via the communication unit 22, and performs the necessary reservation processing. On this occasion, billing processing related to an agent charge for reservation, etc. is performed as necessary.

The facility information registration part 202 stores this reservation information in My Page for every user, when reservation processing at a registered facility is completed. The facility information registration part 202 notifies the electronic device 3 that the reservation has completed via the navigation server 1.

Facility information including the identification information of facilities, name, genre, telephone number, address, positional information specified by the latitude/longitude, for example, information related to goods and services provided by the facility, vacancy information, coupon issuance information, etc., is stored in the storage unit 21.

In addition, reservation information showing the reservation conditions at facilities for every user, coupon information showing the contents of coupons (discount ticket) offered by facilities, and My Page set for every user of the electronic device 3 (destination setting information compiling destinations or facilities set as stopping places) are saved in the storage unit 21.

The communication unit 22 is connected to a network such as an internet line, and conducts sending/receiving (data communication) of packet data, etc. with the facility server 4.

The connection interface unit 23 connects the facility information server 2 to the navigation server 1. The facility information server 2 performs sending/receiving of data with the navigation server 1 via the connection interface unit 23.

(Electronic Device)

Figure 3:
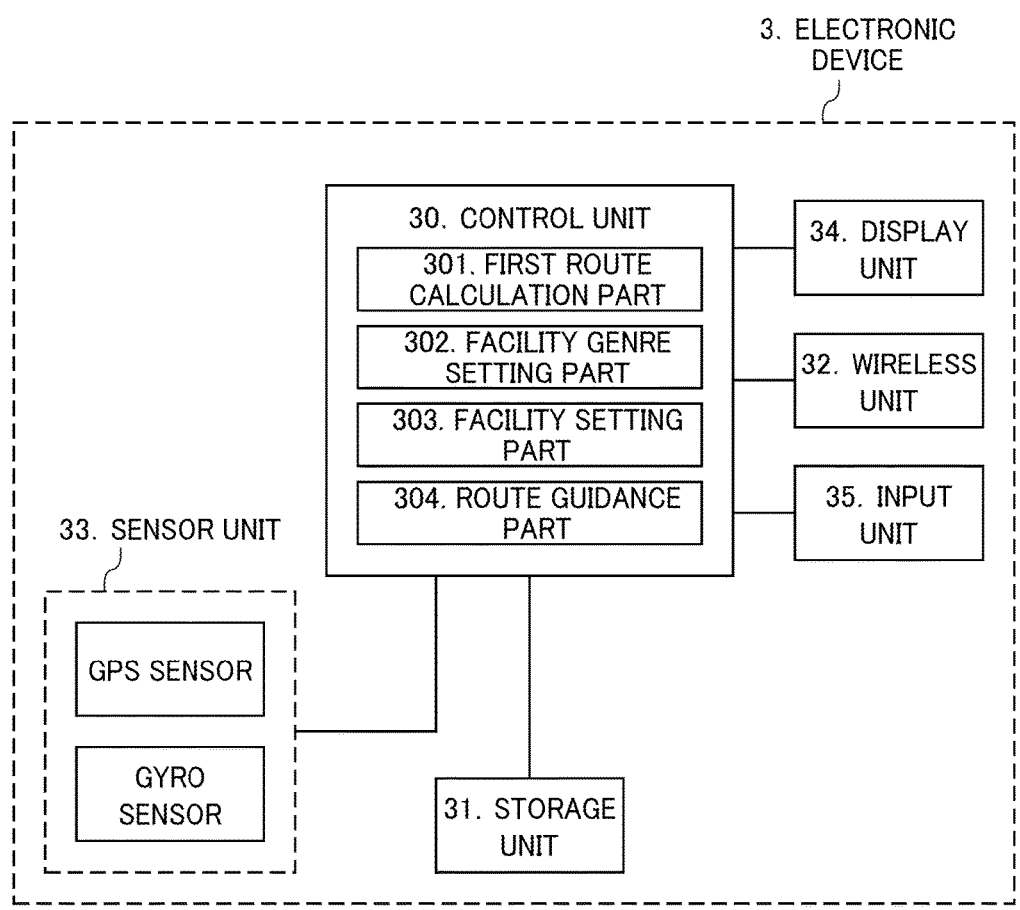
FIG. 3 is a view showing the configuration of an electronic device.

As shown in FIG. 3, the electronic device 3 at least includes a control unit 30, storage unit 31, wireless unit 32, sensor unit 33, display unit 34 and input unit 35.

The control unit 30 is configured from a microprocessor having a CPU, RAM, ROM, I/O, etc. The CPU executes each program for route guidance read from the ROM or storage unit 31, reads information from the RAM, ROM and storage unit 31 upon execution thereof, performs writing of information in the RAM and storage unit 31, and performs transfer of signals with the wireless unit 32, sensor unit 33, display unit 34 and input unit 35.

By the control unit 30 executing each program for route guidance, it causes to function as a predetermined means (hereinafter collectively referred to as "route setting and guidance unit") in the electronic device 3. For example, when starting each program for route guidance, route guidance that instructs turning while displaying the current position becomes possible using the positional information from the sensor unit 33.

In addition, by the control unit 30 executing each program for route guidance, it causes a predetermined sequence ("hereinafter collectively referred to as "route setting guidance sequence") to be executed in the electronic device 3.

Hereinafter, the functions possessed by the control unit 30 will be explained from the viewpoint of a route setting and guidance unit. It should be noted that an explanation based on the viewpoint of a route guidance sequence (method) is omitted since it is possible to explain by substituting "unit" for "sequence".

The control unit 30 includes a first route setting part 301, facility genre setting part 302, facility setting part 303, and route guidance part 304.

The first route setting part 301 displays to the user a screen for inputting the departure position, destination and departure time via the display unit 34. On this occasion, the first route setting part 301 specifies the current position (latitude and longitude) using the sensor unit 33, and default sets the current position as the departure position. Similarly, the first route setting part 301 specifies the current time, and default sets the current time as the departure time. The first route setting part 301 sets the destination input from the user via the input unit 35.

It should be noted that the first route setting part 301 can prompt the departure position to be input from the user via the input unit 35 in place of the current position that is default set. In addition, it is possible to prompt the departure time to be input from the user via the input unit 35 in place of the current time that is default set.

The first route setting part 301 sends the positional information serving as the departure position, coordinate information of the destination and departure time to the navigation server 1 via the wireless unit 32.

The facility genre setting part 302 displays the first route serving as the optimum route from the departure position to the destination received from the navigation server 1 to be superimposed on a road map, via the display unit 34.

The facility genre setting part 302 displays to the user a genre list of facilities located in the vicinity on the first route via the display unit 34, and prompts to select the genre of facilities at which the user wants to stop while traveling the first route. The facility genre setting part 302 sends the facility genre selected by the user to the navigation server 1 via the wireless unit 32.

It should be noted that the facility genre setting part 302 can prompt the user to input how far away a distance range from a point on the first route to set the vicinity on the first route. In this case, the facility genre setting part 302 sends the distance range input by the user along with the facility genre selected by the user to the navigation server 1 via the wireless unit 32.

The facility setting part 303 displays a plurality of candidate facility information located in the vicinity on the first route, including facility information relating to all facilities belonging to the genre selected by the user located in the vicinity on the first route and the expected arrival time at the facility, for every time span of the expected arrival time, to be scrollable to the user via the display unit 34. It should be noted that the facility setting part 303 displays detailed information of goods and services contents provided at the facility in response to the instruction of the user.

The facility setting part 303 prompts the user to select a facility at which the user wants to stop while traveling on the first route, and to input a staying time at the facility. The facility setting part 303 sends the facility selected by the user and staying time at the facility to the navigation server 1 via the wireless unit 32.

The route guidance part 304 performs route guidance following the route set by the user.

The storage unit 31 is configured by semiconductor memory, etc., and stores the operating system (OS) and respective programs for route guidance, and further, a variety of information such as map information and positional information. It should be noted that it may be a configuration that acquires map information from the navigation server 1, in addition to storing in the storage unit 31.

The wireless unit 32 has a DSP (Digital Signal Processor), etc., is connected to a mobile telephone network, and is configured to be able to perform wireless communication through a wireless base station (not illustrated), and perform wireless communication with a server such as a traffic information center or navigation server 1. The wireless unit 32 can receive data such as map information and traffic control information, for example, from such servers.

The sensor unit 33 makes it possible for the electronic device 3 to grasp the current position by way of a GPS sensor or gyro sensor. The sensor unit 33 includes a function as a position detection means for detecting the current position, receives GPS satellite signals by way of a GPS receiver (not illustrated), and measures the current position (latitude and longitude) of the electronic device 3. In addition, by including a gyro sensor, magnetic field sensor, etc., it is possible to measure the current position of the electronic device 3 by autonomous navigation, and in the case of the GPS receiver not being able to measure position based on GPS satellite signals, it is possible to measure the current position in place of this.

In addition, in the case of GPS communication being impossible, it is possible to use AGPS (Assisted Global Positioning System) communication to calculate the current position of the electronic device 3 according to the base station information acquired from the wireless unit 32.

The display unit 34 is configured by a display device such as a liquid crystal display or organic EL panel, and receives instructions from the control unit 30 to display images. The display unit 34 displays route information and facility information transmitted from the navigation server 1 and map information.

The input unit 35 consists of an input device such as physical switches called a numeric keypad and/or a touch panel (not illustrated) provided to overlap the display screen of the display unit 34, and outputs a signal based on depression of the numeric keypad and touching of the touch panel by the user to the control unit 30.

(Facility Server)

The facility itself includes a server, and performs information provision relating to the goods or services of the facility, office processing relating to goods and reservation of services, billing processing such as an agent charge at the time of reserving or purchasing of goods or services, etc. The server possessed by the facility itself in this way is referred to as the facility server 4.

In the case of the facility including the facility server 4, it performs data communication with the facility information server 2 to synchronize with data relating to information related to goods and services provided by the facility server 4, reservation information, vacancy information, coupon issuance information, etc.

It should be noted that, by using the functions of the facility information server 2, the facility does not necessarily need to furnish the facility server 4.

In the foregoing, an embodiment of the respective functional parts of the navigation system 100 of the present invention are explained based on the configurations of the navigation server 1, facility information server 2, electronic device 3 and facility server 4. However, the embodiment of the respective functional units included by the navigation server 1, facility information server 2 and facility server 4 can be developed so as to execute by one computer, or by distributing between a plurality of computers at a single location or distributed at several locations and interconnected by a communication network. In addition, it is also possible to configure using a plurality of virtual computers on a cloud.

In the case of decentralized processing by a plurality of computers, the respective functions possessed by the navigation server 1, facility information server 2 and facility server 4 can be executed by any of the computers. Therefore, a skilled person can appropriately design to which computer the respective functions possessed by the navigation server 1, facility information server 2 and facility server 4 are assigned.

(Operation of Navigation System 100)

Figure 4A:
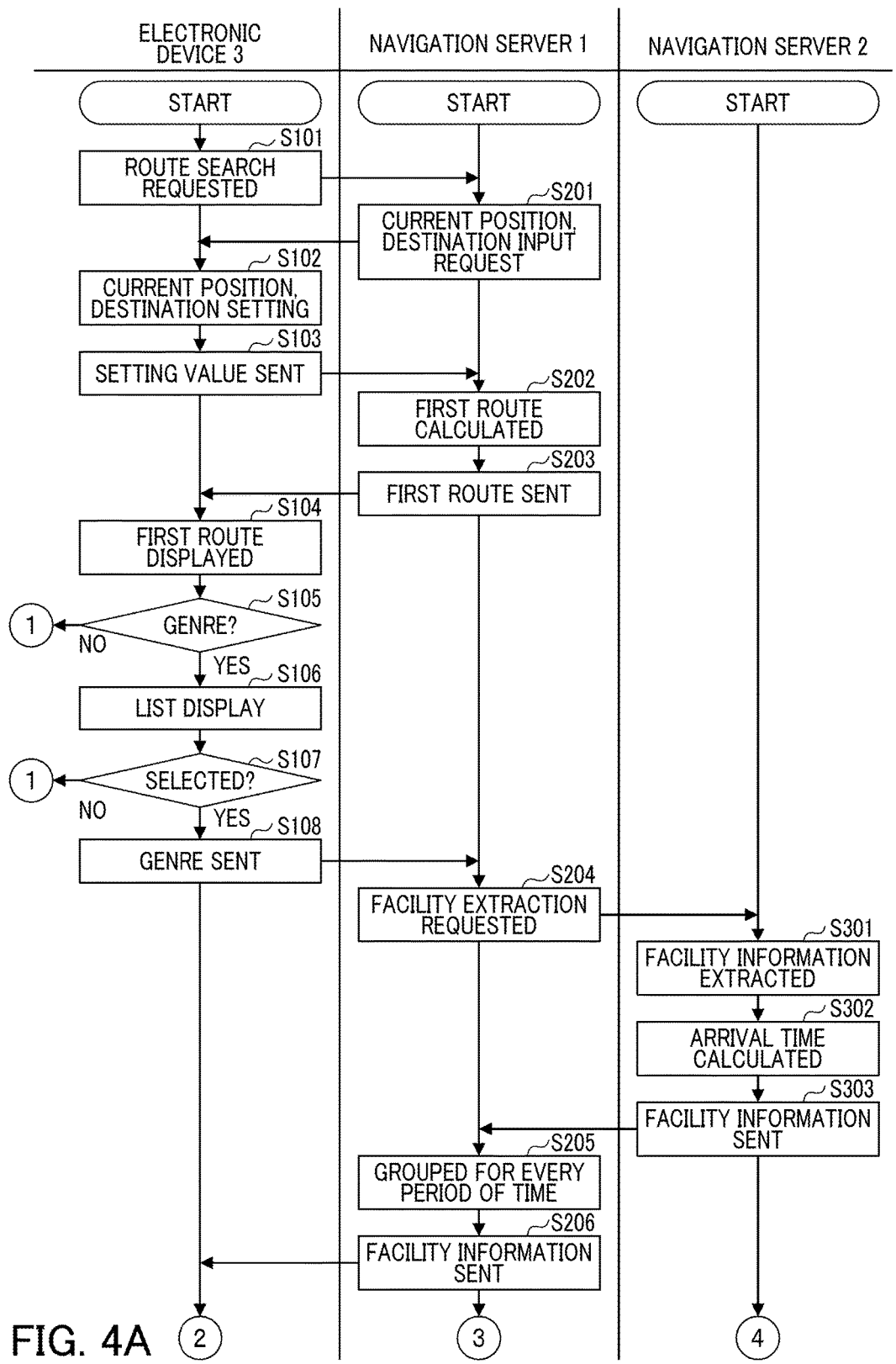
FIG. 4A is a flowchart showing the flow of processing of the navigation system 100.
Figure 4B:
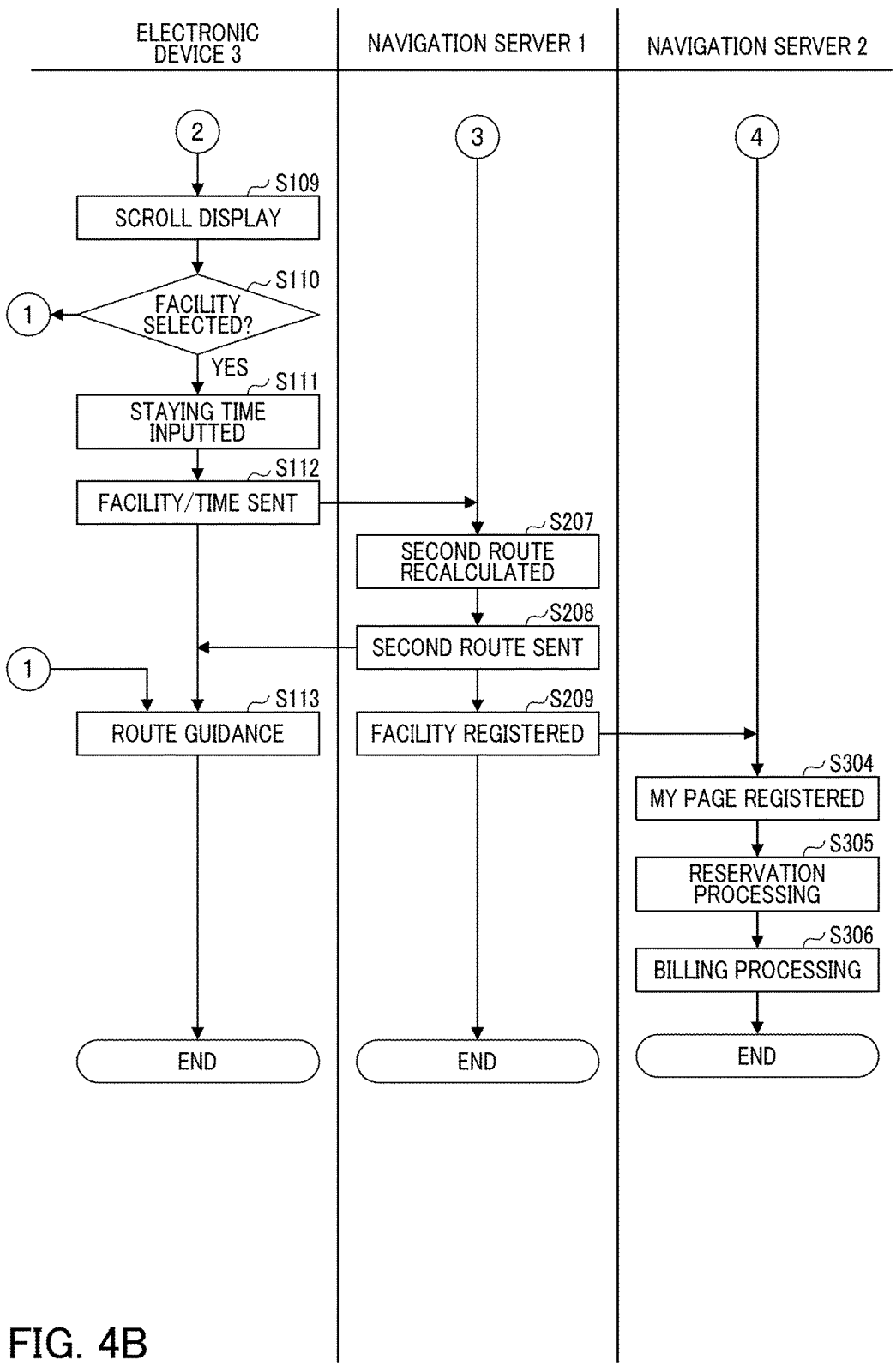
FIG. 4B is a flowchart showing the flow of processing of the navigation system 100.

In the foregoing, the configuration of the navigation system 100 is explained. Next, the operation of the navigation system 100 will be explained. FIG. 4A and FIG. 4B are flowcharts showing the flow of processing of the navigation system 100, and FIG. 5A to FIG. 5G are display examples of navigation screens displayed on the display device 3 accompanying this processing.

First, route information search processing will be explained by referencing FIG. 4A.

In Step S101, the electronic device 3 starts a program for route guidance, and sends a route information search start request (login request) to the navigation server 1, based on a user ID and password input.

In Step S201, the navigation server 1 activates the first route calculation part 101, based on the route information search start request received from the electronic device 3. The activated first route calculation part 101 sends input requests for departure position, destination and departure time to the electronic device 3 via the communication unit 12.

In Step S102, the first route setting part 301 of the electronic device 3 displays to the user via the display unit 34 the input requests for departure position, destination and departure time received from the navigation server 1. The first route setting part 301 specifies the current position (latitude and longitude) using the sensor unit 33, and initially sets the current position as the departure position. The first route setting part 301 specifies a current time, and initially sets the current time as the departure time. The first route setting part 301 sets the destination input by the user via the input unit 35.

It should be noted that the first route setting part 301 can replace the current position initially set by prompting the user to input the departure position via the input unit 35. In addition, it is possible to replace the current time initially set by prompting the user to input the departure time via the input unit 35.

In Step S103, the first route setting part 301 sends the positional information serving as the departure position, coordinate information of the destination and departure time to the navigation server 1.

In Step S202, the first route calculation part 101 of the navigation server 1 calculates first route information serving as the optimum route from the departure position to the destination, using the map information saved in the storage unit 11, based on the positional information serving as the departure position, coordinate information of the destination and departure time received from the electronic device 3.

In Step S203, the first route calculation part 101 sends the calculated first route information to the electronic device 3 via the communication unit 12.

It should be noted that, in Step S202, the first route calculation part 101 may be configured so as to calculate a plurality of routes from the departure position to the destination, send a plurality of routes to the electronic device 3, prompt the user to select from the plurality of routes, and determine the selected route of the user as the first route information.

In Step S104, the facility genre setting part 302 of the electronic device 3 displays the first route information received from the navigation server 1 via the display unit 34 to be superimposed on a road map.

In Step S105, the facility genre setting part 302 determines whether or not there is a list display request of facility genres from the user. In the case of there being a list display request of facility genres (YES), the processing advances to Step S106. In the case of there not being a list display request of facility genres (NO), the processing advances to Step S113.

In Step S106, the facility genre setting part 302 displays to the user a facility genre selection screen displaying a genre list of facilities located in the vicinity on the first route via the display unit 34 according to an instruction of the user.

Figure 5A:
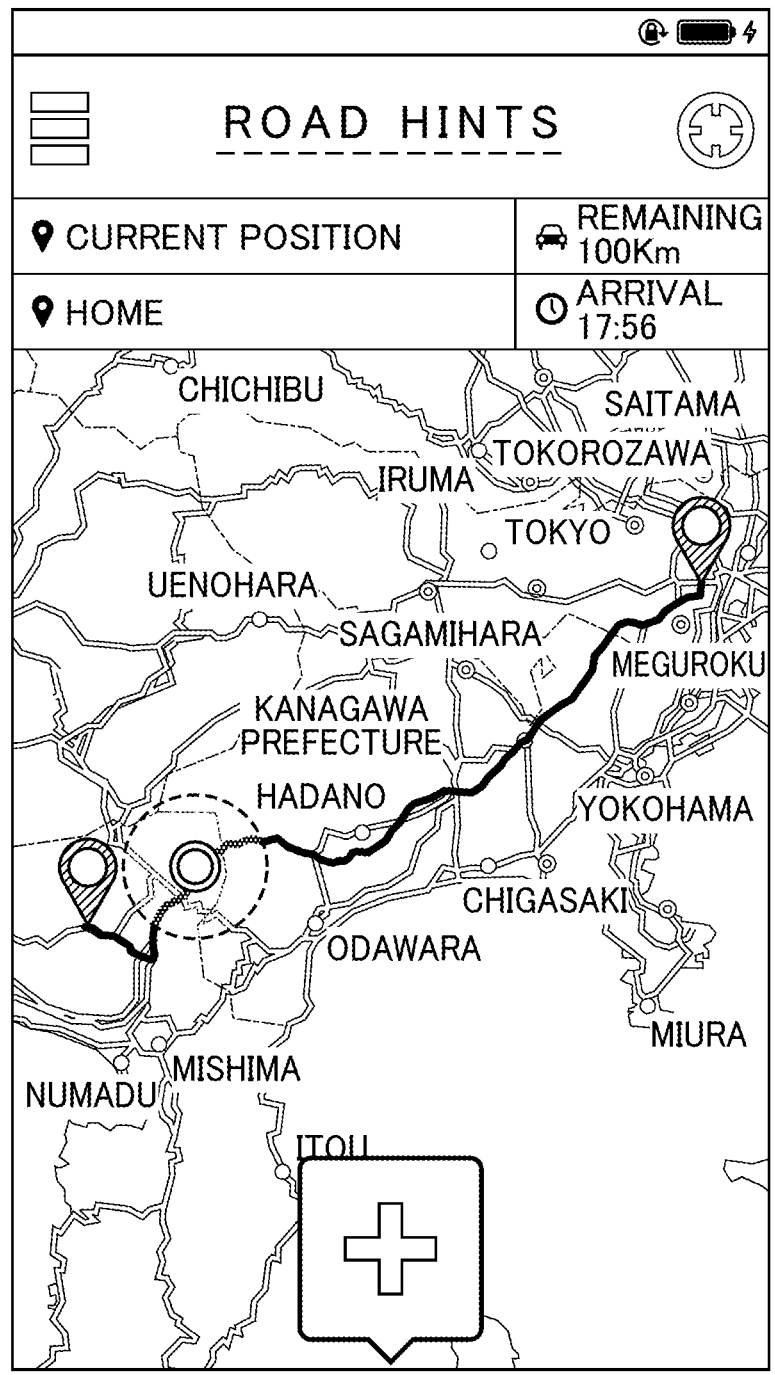
FIG. 5A is a view showing an example of a screen displaying a first route from a current location to a destination displayed on the electronic device.

An example of a display screen of the first route information displayed on the electronic device 3 is shown in FIG. 5A. The facility genre setting part 302 displays a facility genre selection screen like that shown in FIG. 5B, for example, when "+" is pressed by the user in FIG. 5A. It should be noted that, although not illustrated in FIG. 5A and FIG. 5B, in the case of "facility genre skip" being pressed, the processing advances to Step S113.

In Step S107, the facility genre setting part 302 determines whether or not a desired facility genre has been selected by the user. In the case of a desired facility genre having been selected (YES), the processing advances to Step S108. In the case of there not being a list display request of facility genres (NO), the processing advances to Step S113.

Figure 5B:
FIG. 5B is a view showing an example of a screen to designate a genre of facilities for searching facilities existing on a searched route displayed on the electronic device.

It should be noted that the user can set in advance the genres to be displayed on the facility genre selection screen of FIG. 5B. When referencing FIG. 5G, genre candidates are displayed, and the user can select genres displayed on the genre selection screen of FIG. 5B.

In Step S108, the facility genre setting part 302 sends the facility genre selected by the user to the navigation server 1.

It should be noted that, although not illustrated in FIG. 5B, the facility genre setting part 302 can prompt the user to input how far away a distance range from a point on the first route to set the vicinity on the first route. In this case, the facility genre setting part 302 sends the distance range input by the user along with the facility genre selected by the user to the navigation server 1.

In Step S204, the facility search part 102 of the navigation server 1 designates the first route information and the facility genre information selected by the user in the facility extraction part 201 of the facility information server 2, and sends an extraction request for candidate facility information, via the connection interface unit 13.

It should be noted that, in the case of there being an instruction for the distance range from the user (not illustrated in FIG. 5B), the facility search part 102 sends the distance range combined with the first route information and the facility genre information selected by the user to the facility information server 2, via the connection interface unit 13.

In Step S301, based on the first route information and facility genre information selected by the user received from the navigation server 1, the facility extraction part 201 of the facility information server 2 extracts facility information of all facilities belonging to the genre, located in the vicinity on the first route using the facility information saved in the storage unit 11.

It should be noted that, in the case of there being a designation of the distance range by the user, the facility extraction part 201 extracts the facility information of all facilities belonging to the genre at which a short stop is possible from the nearest point located in the vicinity on the first route, based on this distance range.

In Step S302, the facility extraction part 201 calculates the expected arrival time from the departure position for every extracted candidate facility. Herein, the expected arrival time may be calculated using a value set as a default value for the average vehicle speed.

In Step S303, the facility extraction part 201 sends facility related information in which the expected arrival time is attached to the facility information for every candidate facility, to the navigation server 1.

In Step S205, the facility search part 102 of the navigation server 1, when the facility related information is received from the facility information server 2, groups a plurality of candidate facility information located in the vicinity on the first route for every time span of the expected arrival time.

It should be noted that, in place of Step S205, the electronic device 3 may group the plurality of candidate facility information located in the vicinity on the first route for every time span of the expected arrival time, in Step S109 of the electronic device 3 described later.

In Step S206, the facility search part 102 sends, to the electronic device 3, the plurality of candidate facility information located in the vicinity on the first route grouped for every time span of the expected arrival time.

In Step S109, the facility setting part 303 of the electronic device 3 displays the plurality of candidate facility information located in the vicinity on the first route grouped for every time span of the expected arrival time received from the navigation server 1 to the user to be scrollable for every time span of the expected arrival time via the display unit 34.

Figure 5C:
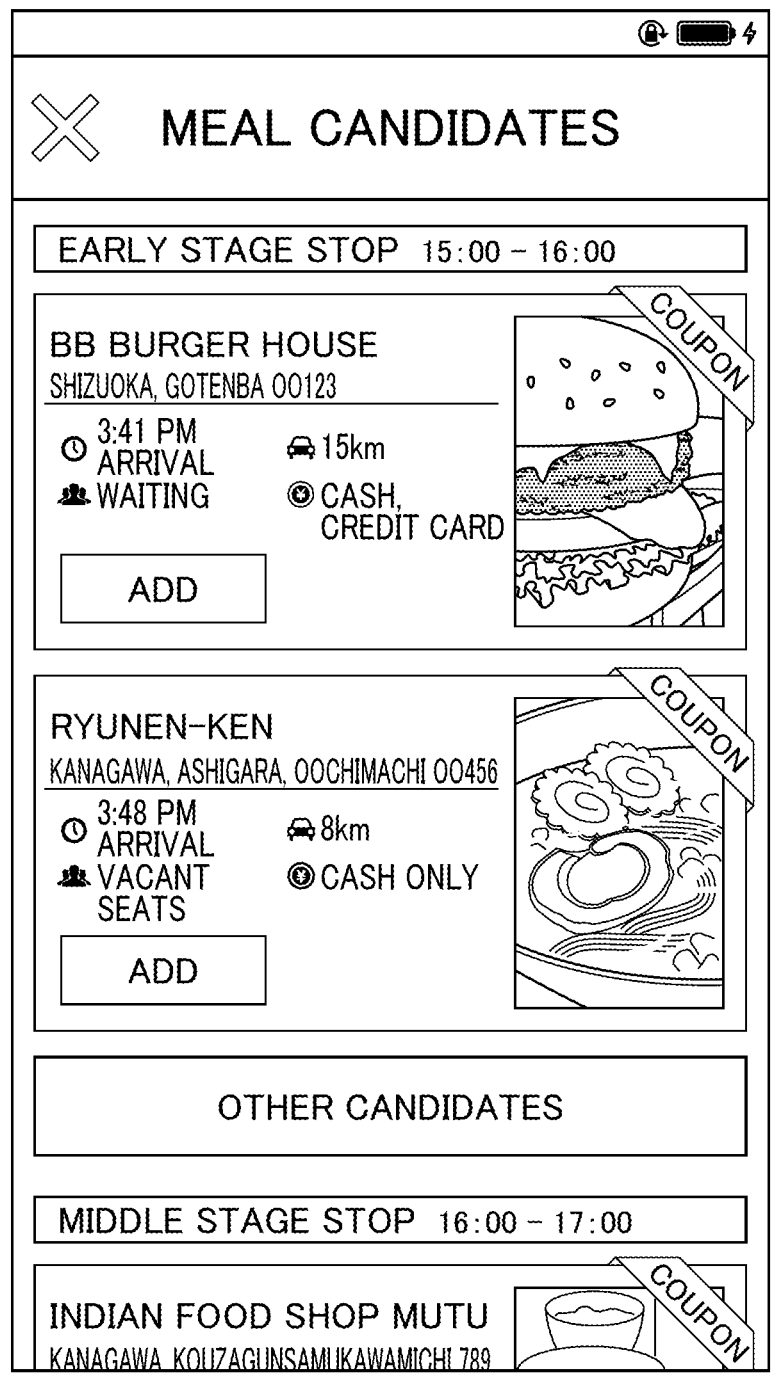
FIG. 5C is a view showing an example of a facility candidate selection screen displaying facility candidates existing on a searched route for every time span, displayed on the electronic device.

An example of an output screen of a plurality of candidate facility information grouped for every time span of the expected arrival time displayed via the display unit 34 is shown in FIG. 5C.

When referencing FIG. 5C, for every time span of the expected arrival time, the name and address of a candidate facility, expected arrival time, distance from the departure position, existence of coupons, congestion information, payment method, etc. are displayed. By presenting the user with information of a facility (coupons, congestion factor) in this way, the user is easily introduced to a facility.

It should be noted that the facility setting part 303 may display a few candidate facilities for ever time span, and display as "other candidates" for the remaining candidate facilities, as shown in FIG. 5C. In this case, by the user selecting "other candidates", the facility setting part 303 displays all of the candidate facility information to be scrollable. It should be noted that the facility setting part 303 may be configured so as to display all candidate facility information for every time span to be scrollable from the beginning.

The facility setting part 303 scrolls the display in response to a scroll operation of the user.

Figure 5D:
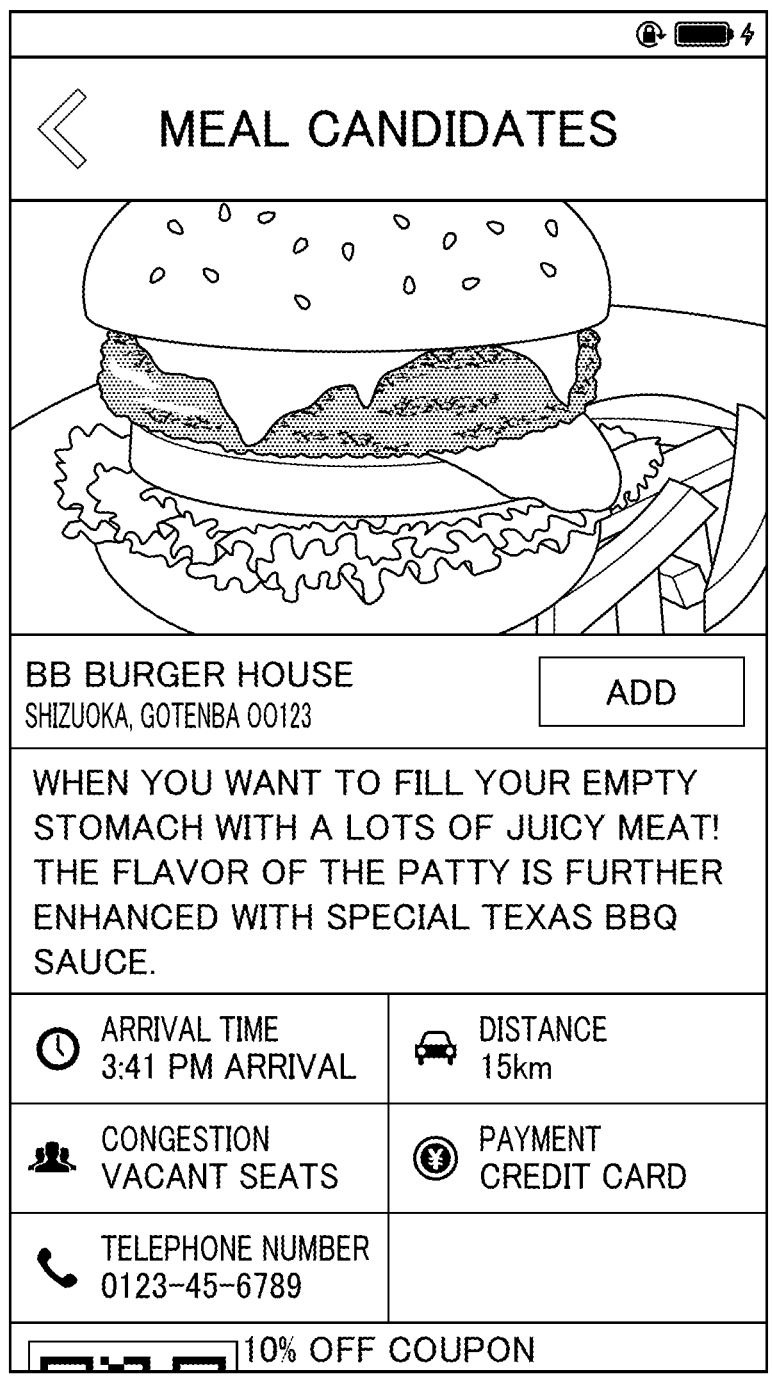
FIG. 5D is a view showing an example of a screen displaying details of goods and services contents provided by the facility candidates existing on a searched route, displayed on the electronic device.

In the case of the user wanting to know details of the goods and services contents provided by a certain facility, the facility setting part 303 displays detailed information like that shown in FIG. 5D in response to the user depressing inside a box (excluding an "add" button), displayed of the facility information, for example.

In the case of the facility genre being restaurant, it is preferable for detailed information of coupons, a menu list provided by the restaurant and reputation information of the restaurant to be displayed as the detailed information.

In Step S110, the facility setting part 303 determines whether or not the user has selected a facility. In the case of the user having selected a facility (YES), the processing advances to Step S111. In the case of not being selected, the processing advances the Step S113.

It should be noted that in the case of there not being a preferred facility to select for the user, a repeat search of the first route may be performed according to an instruction of the user.

In Step S111, the facility setting part 303 displays a screen for inputting a staying time at the selected facility.

Figure 5E:
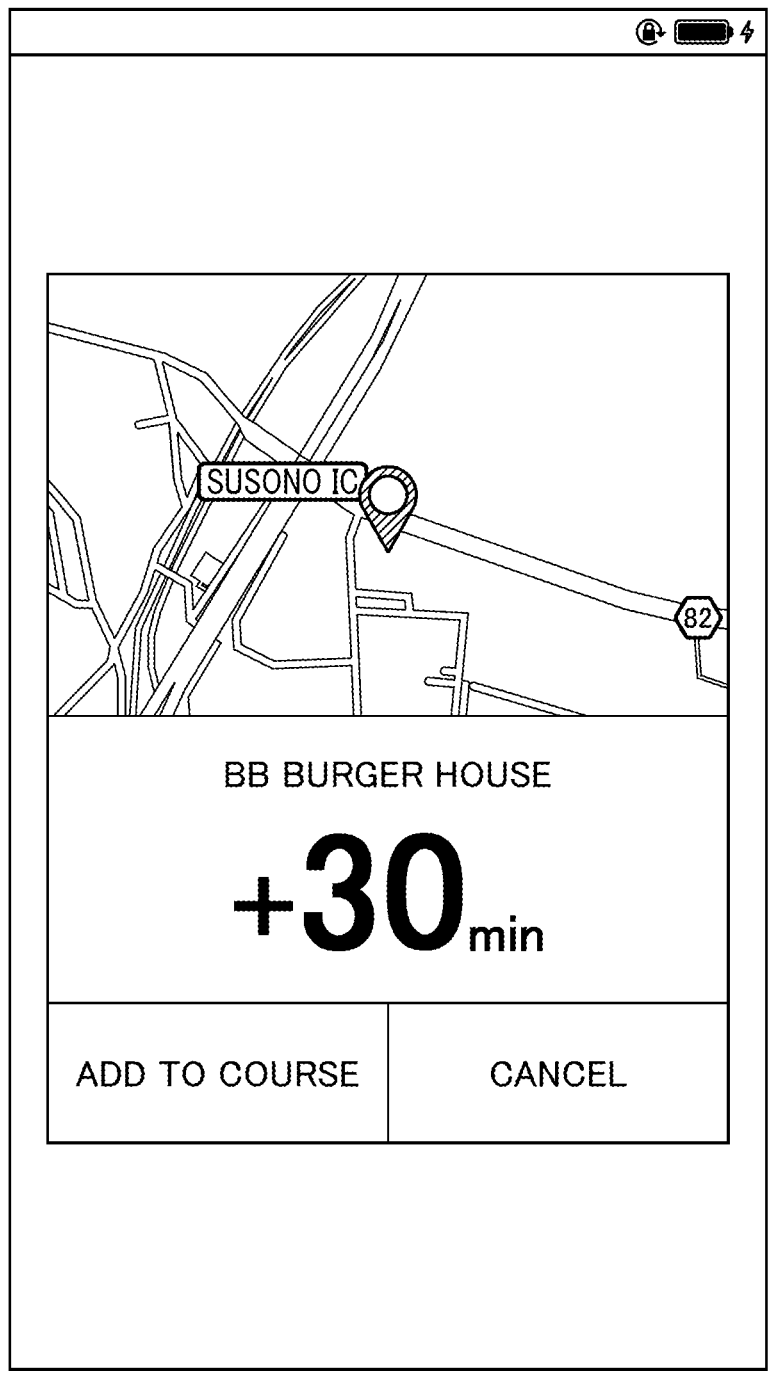
FIG. 5E is a view showing an example of a screen for selecting a facility candidate existing on a searched route, and inputting a staying time at the facility.

When referencing FIG. 5C or FIG. 5D, for example, the facility setting part 303 displays a staying time input screen like that shown in FIG. 5E, in response to the user pressing an "add" button inside the box, displayed of the facility information. On this occasion, although not illustrated, it is possible to input reservation information and payment information as necessary.

In Step S112, the facility setting part 303 sends a facility selected by the user and staying time at the facility to the navigation server 1. It should be noted that, in the case of reservation information or payment information being inputted, the facility setting part 303 sends the inputted reservation information and payment information to the navigation server 1 according to the facility selected by the user and staying time at the facility.

In Step S207, with the facility selected by the user and staying time at the facility received from the electronic device 3 as added conditions, the second route calculation part 103 of the navigation server 1 calculates the second route using map information saved in the storage unit 11, based on the departure position, destination, coordinate information of the facility selected by the user, staying time at the facility, etc.

Herein, second route is a route produced taking account of a short stop at a facility located in the vicinity on the first route selected by the user and the staying time.

In Step S208, the second route calculation part 103 sends second route information, including the expected arrival time at the facility located in the vicinity on the first route selected by the user and the staying time, to the electronic device 3 via the communication unit 12.

In Step S209, the second route calculation part 103 sends a registration request to My Page of the user, related to the facility registered as a stopping point on the second route by the user, to the facility information server 2.

It should be noted that, in the case of receiving reservation information and payment information by a user from the electronic device 3, the second route calculation part 103 sends the reservation information and payment information to the facility information server 2 in combination with the registration request to My Page of the user.

In Step S304, the facility information registration part 202 of the facility information server 2 registers, in My Page for every user of the storage unit 21, facilities registered as stopping points on the second route received from the navigation server 1.

In Step S305, the facility information registration part 202 performs reservation processing based on reservation information from the user received from the navigation server 1. It should be noted that, in the case of the facility including a facility server 4, the facility server 4 corresponding to the facility is accessed via the communication unit 22 as necessary, and reservation processing is performed.

The facility information registration part 202 stores coupon use information, etc. in My Page for every user of the storage unit 21, for example, when reservation processing for the registered facility completes.

Figure 5F:
FIG. 5F is a view showing an example of a screen displaying coupon use history of a user displayed on the electronic device.
Figure 5G:
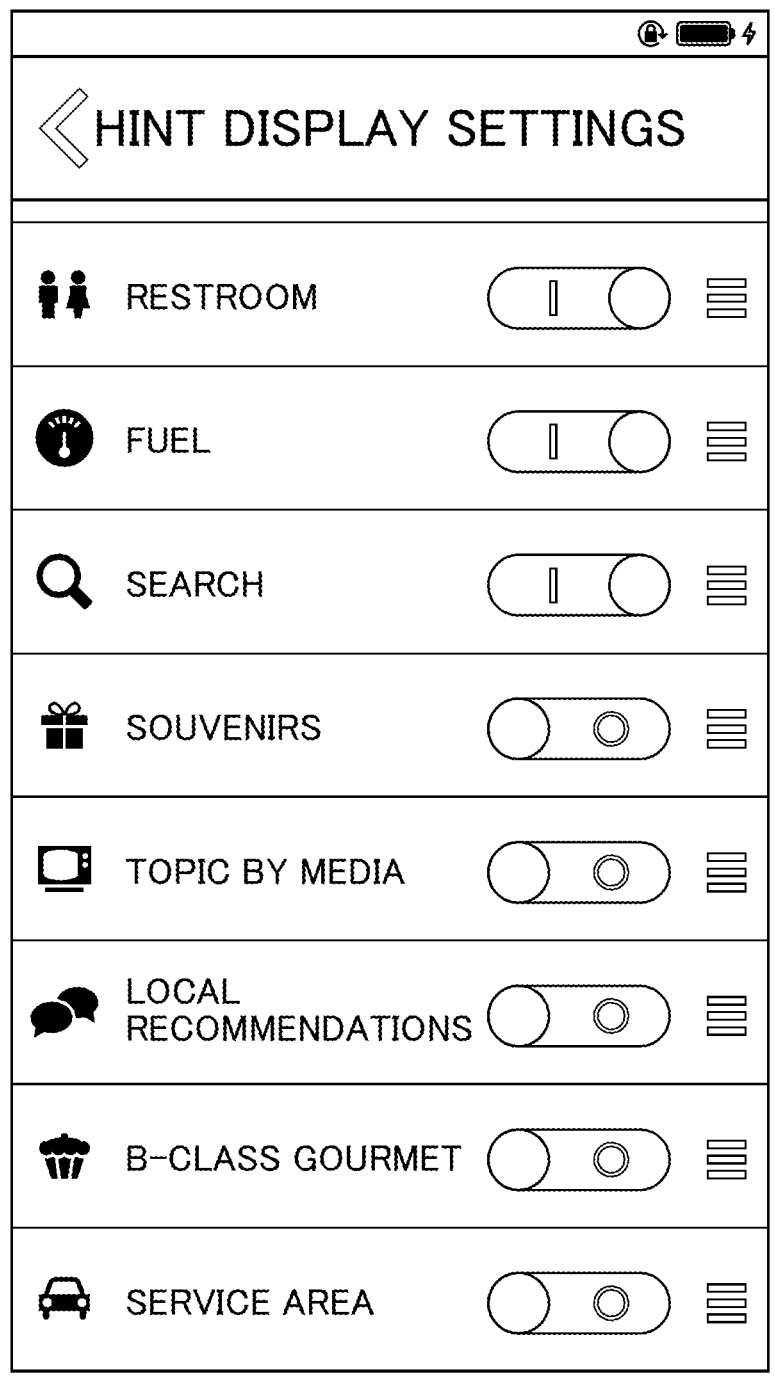
FIG. 5G is a view showing an example of a screen for a user to set in advance genres to display on a screen (FIG. 5B) to designate the genre of facilities, displayed on the electronic device.

It should be noted that it is possible to display coupon use history, for example, as shown in FIG. 5F, as the information stored in My Page for every user.

By configuring in this way, it becomes possible to browse an estimated money amount that could be saved by the user using the coupon.

In Step S306, the facility information registration part 202 performs billing processing such as an agent charge as necessary, accompanying reservation processing at the registered facility, etc.

In Step S113, the route guidance part 304 of the electronic device 3 starts route guidance by displaying route guidance on the display unit 34 according to the second route information received from the navigation server 1.

It should be noted that, in the case of a facility genre not having been designated in Step S105 or Step S107, the route guidance part 304 starts route guidance by displaying route guidance on the display unit 34 according to the first route information received from the navigation server 1.

It should be noted that, after route guidance starts, in the case such as a big delay in the expected arrival time at the selected facility occurring for reasons such as a traffic jam, it may be done again from searching of the first route.

(Modified Example)

In the foregoing, the navigation system 100 of the first embodiment is explained. The electronic device according to the first embodiment was implemented as the electronic device 3; however, as another embodiment, it is possible to implement the electronic device as an on-board navigation device equipped to a vehicle.

In addition, the servers according to the first embodiment are implemented as the decentralized servers of the navigation server 1 and facility information server 2; however, as another embodiment, it is possible to implement as one server.

In addition, the servers according to the present embodiment are implemented as a decentralized system configured from the two servers of the navigation server 1 and the facility information server 2; however, as another embodiment, it may be configured as a decentralized processing system that distributes the respective functions (for example, the functions of step units illustrated in FIG. 4A and FIG. 4B) of the navigation server 1 and facility information server 2 to a plurality of servers as appropriate. In addition, the respective functions of the navigation server 1 and the facility information server 2 may be realized using virtual server functions, etc. on a cloud server.

The following such effects are exerted according to the navigation system 100 explained in the foregoing.

(1) With the navigation system 100 of the above-mentioned embodiment, the facility setting part 303 of the electronic device 3 displays facility information of all facilities belonging to the genre selected by the user located in the vicinity on the first route and the expected arrival time at the facility received from the navigation server 1, for every time span of the expected arrival time, via the display unit 34 to be scrollable.

It is thereby possible for the electronic device 3 to present more facilities extending over different time spans to the user, for facilities existing on a searched route, upon the user performing navigation (route guidance) using the electric device 3. The user can select a preferred facility from the more options, and the satisfaction of the user improves by registering as a relay point (stopping point) on a route to the destination.

(2) According to the electronic device 3 of the above-mentioned embodiment, for facilities located in the vicinity on the first route to the destination, it is possible for the electronic device 3 to present to the user more facilities extending over different time spans. The user can select a preferred facility from more options, and a second route registering this as a relay point (stopping point) on a route to the destination can be displayed.

The satisfaction of the user is thereby improved since a preferred facility and preferred time span are selected from the facilities existing on the searched route, and with the facility selected by the user on the route to the destination as a relay point (stopping point), second route information is presented to arrive in the time span selected by the user, upon the user performing navigation (route guidance) using the electronic device 3.

(3) According to the navigation server 1 and facility information server 2 of the above-mentioned embodiment, it is possible to provide a service to the electronic device 3 communicably connected with the navigation server 1 whereby, for facilities located in the vicinity on the first route to the destination, more facilities extending over different time periods are presented, and a second route is displayed in which a facility selected by the user is registered as a relay point (stopping point) on the route to the destination.

The satisfaction of the user is thereby improved since the navigation server 1 presents facilities existing on the first route extending over time spans to the electronic device 3, and presents second route information in which a facility selected by the user is registered as a relay point (stopping point) on the route to the destination, upon the user performing navigation (route guidance) using the electronic device 3 communicably connected with the navigation server 1.

In the foregoing, preferred embodiments of the present invention are explained; however, the present invention is not to be limited to the aforementioned embodiments, and modifications thereto are possible where appropriate.

What is claimed is:

1. A server that performs navigation from a departure position to a destination, the server comprising:

a storage unit that stores facility information;

a facility search unit that searches, from among facilities located within a predetermined distance from a point on a first route from a departure position to a destination, for a facility belonging to a genre received from an electronic device communicably connected with the server, using the facility information saved in the storage unit, calculates an expected arrival time for all facilities found, and sends the facility information of the facility and the expected arrival time to the electronic device, wherein, in a case in which time required from a departure position to a destination is long, the facility search unit sets a plurality of time spans so as to lengthen each time span and enable the electronic device to display facility information of the facilities based on the expected arrival time, for each of the plurality of time spans; and a second route calculation unit that calculates second route information from the departure position to the destination that registers a facility selected by a user and received from the electronic device as a relay point, and sends the second route information to the electronic device.

2. A navigation method by a server that includes a control unit and a storage unit storing facility information, the method comprising the steps of the control unit:

searching, from among facilities located within a predetermined distance from a point on a first route from a departure position to a destination, for facilities belonging to a genre received from an electronic device communicably connected with the server, using the facility information saved in the storage unit, calculating an expected arrival time for each facility found, and sending facility information of the facility and the expected arrival time to the electronic device, wherein, in a case in which time required from a departure position to a destination is long, setting a plurality of time spans so as to lengthen each time span and enable the electronic device to display facility information of the facilities based on the expected arrival time, for each of the plurality of time spans; and calculating second route information from the departure position to the destination that registers a facility selected by a user and received from the electronic device as a relay point, and sending the second route information to the electronic device.

* * * * *